(12) United States Patent
Aoyama et al.

(10) Patent No.: US 6,774,522 B2
(45) Date of Patent: Aug. 10, 2004

(54) ROTOR WITH SLOT WEDGES HAVING DIFFERENT DIMENSION TO REDUCE STRESS

(75) Inventors: Hiroshi Aoyama, Tsuchiura (JP); Hidehiro Ejima, Hitachi (JP); Kazuo Gotou, Mito (JP)

(73) Assignee: Hitachi, Ltd., Tokyo (JP)

( * ) Notice: Subject to any disclaimer, the term of this patent is extended or adjusted under 35 U.S.C. 154(b) by 19 days.

(21) Appl. No.: 10/263,696

(22) Filed: Oct. 4, 2002

(65) Prior Publication Data

US 2003/0155833 A1 Aug. 21, 2003

(30) Foreign Application Priority Data

Feb. 21, 2002 (JP) ........................................ 2002-044514

(51) Int. Cl.[7] .............................................. H02K 3/487
(52) U.S. Cl. ...................................................... 310/214
(58) Field of Search ................................ 310/214, 215, 310/61, 261, 262

(56) References Cited

U.S. PATENT DOCUMENTS

| | | | | |
|---|---|---|---|---|
| 1,271,409 A | * | 7/1918 | Wynne | ........................ 310/214 |
| 2,484,007 A | * | 10/1949 | Atwell | ........................ 310/214 |
| 4,900,964 A | * | 2/1990 | Ying et al. | ................... 310/215 |
| 5,469,009 A | * | 11/1995 | Wakui et al. | ................ 310/214 |

FOREIGN PATENT DOCUMENTS

JP          11-299143          10/1999          ............ H02K/1/26

\* cited by examiner

*Primary Examiner*—Karl Tamai
(74) *Attorney, Agent, or Firm*—Crowell & Moring LLP

(57) ABSTRACT

A rotor structure is to be provided which can diminish stress concentration in teeth-wedge fitting portions located near magnetic poles of a rotor in a rotary electric machine. Teeth 6 have slant faces for abutment against slant faces of wedges 8 to retain the wedges in a fitted state between adjacent teeth, the wedges 8 having slant faces each formed at a predetermined angle relative to the radial direction of a rotor 1, and a circular arc is formed at each slant face rising position in the teeth 6. In this case, the radius of the circular arc formed at each slant face rising position 12 in a preset number of teeth 6 located near magnetic pole portions 7 of the rotor 1 is set larger that of the circular arc formed in the remaining teeth.

3 Claims, 5 Drawing Sheets

ROTOR WITH SLOT WEDGES HAVING DIFFERENT DIMENSION TO REDUCE STRESS

BACKGROUND OF THE INVENTION

The present invention relates to the structure of a rotor in a rotary electric machine suitable for use in a turbine generator or the like.

Generally, field windings for DC exciting a generator are wound round a cylindrical rotor of a rotary electric machine such as a turbine generator. Plural slots are axially formed in the other portion than magnetic pole portions of an iron core of the rotor. The slots are formed at equal intervals in the circumferential direction of the rotor.

The field windings are inserted into the slots and are held by wedges. The wedges each have a slant face formed at a predetermined angle relative to the radial direction of the rotor core and are fitted in the slots. Teeth, which are comb teeth-like, are formed between adjacent slots and have slant faces for abutment against the slant faces of the wedges to retain each wedge in a fitted state between adjacent teeth.

The rotor in a rotary electric machine constructed as above is described, for example, in Japanese Patent Laid Open No. 11-299143.

Centrifugal forces of windings and wedges fitted inside the slots are applied to the teeth and a large force is applied constantly to the teeth-wedge fitted portions. This force becomes large particularly when the application of load and the removal thereof are repeated at the time of turning ON and OFF of the rotor.

On the other hand, the rotor has two or four unslotted portions called magnetic pole portions (magnetic poles). Usually, in many cases, an iron wedge is inserted into a slot located near a magnetic pole to stabilize the distribution of a magnetic field. Wedges made of aluminum, which is lighter than iron, are inserted into slots positioned apart from the magnetic pole portions. Therefore, a problem is encountered such that a larger centrifugal force is applied to teeth located near the magnetic pole portions relative to the other teeth.

Recently, for reducing the size of a rotor by enlarging a magnetic field generated in a field system, slots are set large in depth and width to receive a larger number of windings therein. Consequently, the application of a larger centrifugal force to teeth located near magnetic pole portions is becoming more and more conspicuous.

SUMMARY OF THE INVENTION

The present invention has been accomplished in view of the above-mentioned problems and it is an object of the invention to provide a rotor in a rotary electric machine capable of diminishing stress concentration on teeth located near magnetic poles, thereby preventing damage of the teeth, and capable of deepening slots, thereby enlarging a magnetic field generated in field windings.

The present invention is characteristic in that a rising position of each slant face of teeth forms a circular arc and, in a preset number of teeth located near magnetic pole portions of the rotor, the radius of curvature (radius) of the circular arc formed at the rising position of each slant face is set larger than that of the circular arc formed at the rising position of each slant face in the remaining teeth, the teeth having the slant faces for abutment against slant faces of wedges to retain the wedges in a fitted state between adjacent teeth, the slant faces of the wedges being formed at a predetermined angle relative to the radial direction of the rotor.

In other words, according to the present invention, a preset number of teeth located near each of magnetic pole portions are constituted so as to be decreased in stress at rising positions of their slant faces.

In the present invention, in a preset number of teeth located near magnetic pole portions, the radius of a circular arc formed at each slant face rising position is set larger than that of a circular arc formed at each slant face rising position in the remaining teeth, whereby the stress in each slant face rising position of the teeth can be decreased and hence it is possible to prevent damage of the teeth. As a result, it is possible to deepen slots and enlarge a magnetic field generated in field windings, thus permitting the reduction in size of the rotor.

DESCRIPTION OF THE PREFERRED EMBODIMENTS

An embodiment of the present invention will be described below with reference to the drawings.

Figure 1:
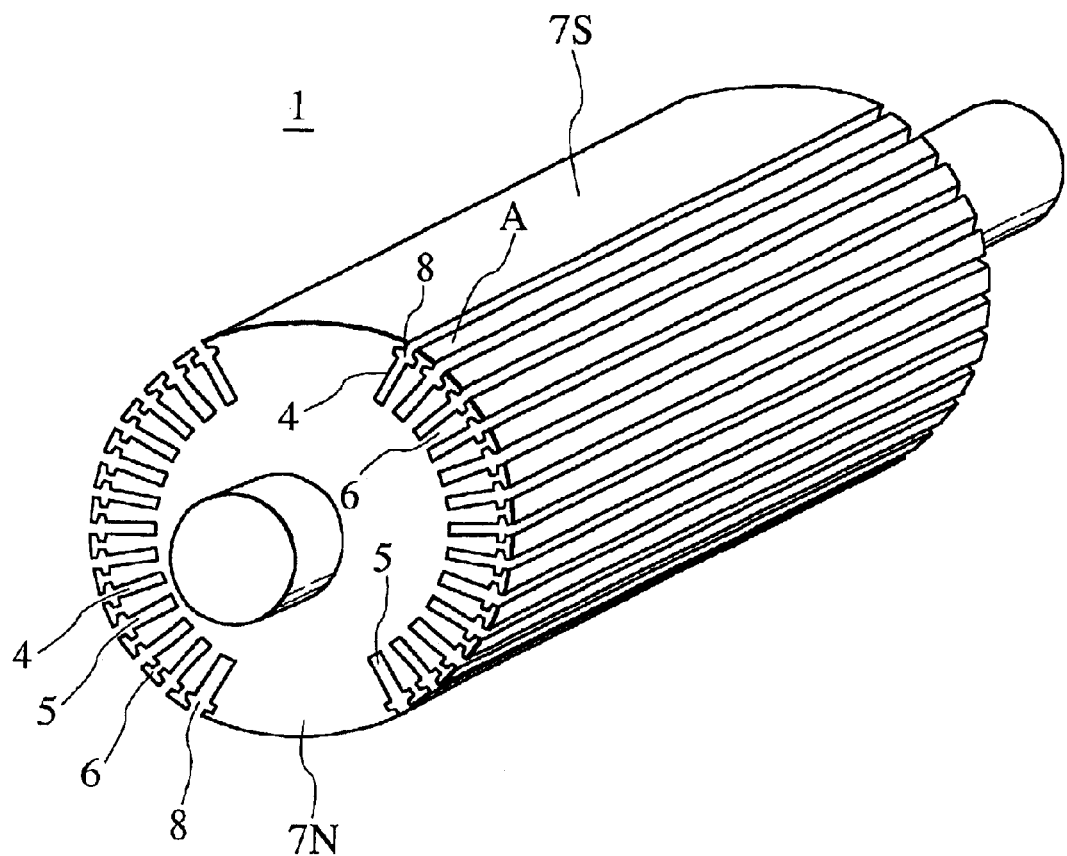
FIG. 1 is a perspective view of a rotor in a rotary electric machine according to an embodiment of the present invention.

FIG. 1 is a perspective view of a rotor in a rotary electric machine according to the present invention.

In FIG. 1, a rotor 1 is constituted in an axially cylindrical shape. Plural slots 5 are formed axially in an outer periphery of the rotor 1. The slots 5 are arranged, at equal intervals in the circumferential direction of the rotor 1. Field windings 4 are inserted into the slots 5. By machining the slots 5 there are formed teeth 6 like comb teeth between adjacent slots 5.

The rotor 1 is formed with magnetic pole portions 7S and 7N in which the slots 5 are not formed. In this embodiment there is shown an example in which there are formed two magnetic pole portions 7S and 7N, but there also is a case where four such magnetic pole portions are provided. Within each slot 5, a wedge 8 is fitted and retained between adjacent teeth 6 of the rotor 1 to prevent the associated field winding 4 from jumping out radially under the action of a centrifugal force during rotation of the rotor.

Figure 2:
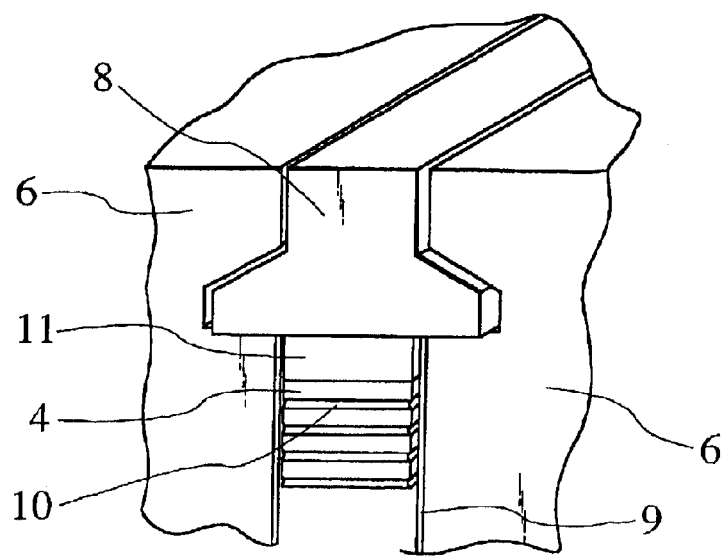
FIG. 2 is a partially enlarged view of the rotor.

FIG. 2 is an enlarged view of portion A in FIG. 1.

In FIG. 2, a resinous plate called a slot armor 9 for electrical insulation is disposed on an inner side wall of each of the slots 5 which are separated from one another by the teeth 6. The field windings 4 are rectangular in section and stacked in plural stages, with an inter-layer insulator 10 being interposed between adjacent such stages. A clippage block 11 for electrical insulation is in abutment against the field winding 4 located at the outermost periphery and the wedge 8 inserted into the associated slot and supported by adjacent teeth 6 causes the field windings 4 to withstand the centrifugal force during rotation of the rotor.

Figure 3:
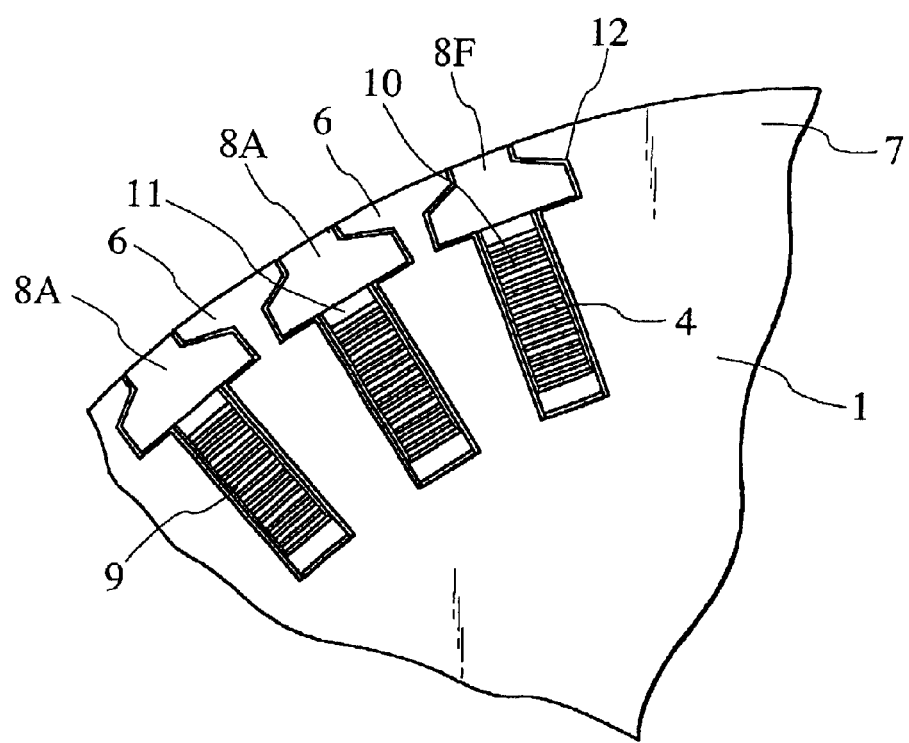
FIG. 3 is a sectional view of a principal portion of the rotor.
Figure 4:
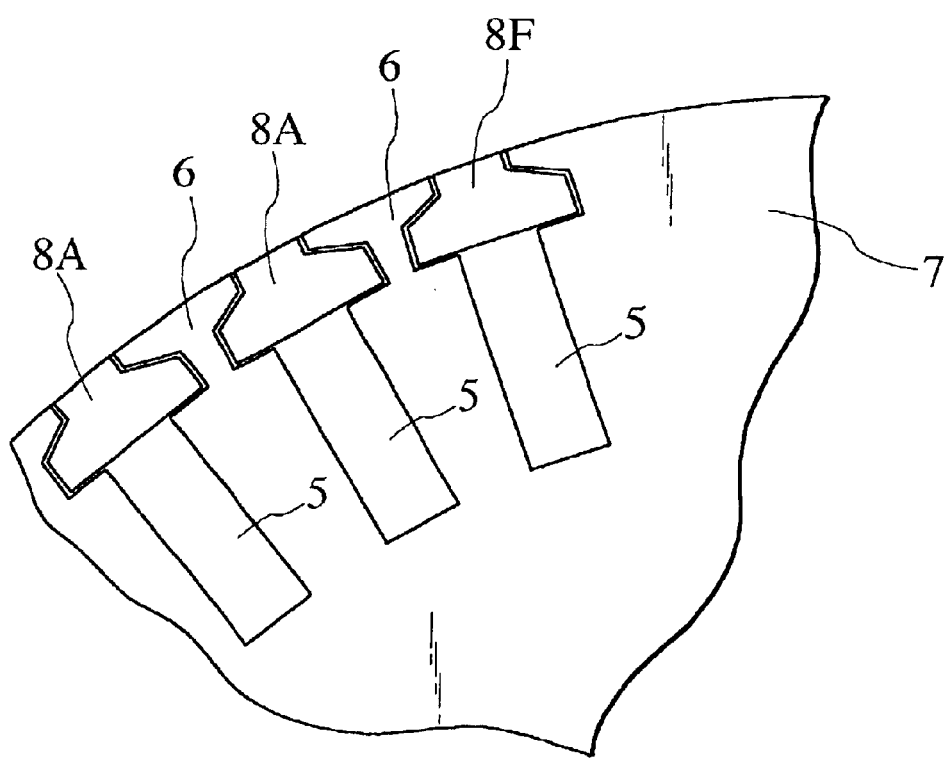
FIG. 4 is a sectional view of a head portion of the rotor.

FIGS. 3 and 4 are sectional views of the rotor and FIG. 5 is an enlarged view of a teeth 6-wedge 8 fitting portion.

In FIGS. 3 and 4, an iron wedge 8F is fitted in the slot 5 located closest to a magnetic pole portion 7, while aluminum wedges 8A are fitted in the other slots 5. The wedges 8 each have a slant face formed at a predetermined angle relative to the radial direction of the rotor (rotor core) 1.

Figure 5A:
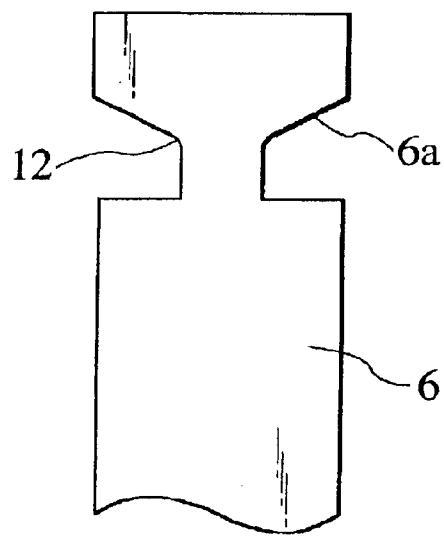
FIGS. 5A and 5B are sectional views of teeth in the rotor.
Figure 5B:
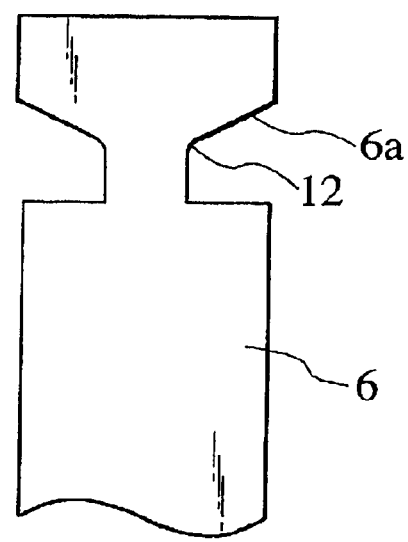

As shown in FIGS. 5(a) and (b), the teeth 6 located between adjacent slots are formed with slant faces 6a for abutment against the slant faces of each wedge 8 to retain the wedge in a fitted state between the teeth. A rising position 12 of each slant face 6a in each teeth portion 6 is formed in an arcuate shape. As shown in FIG. 5(b), in the teeth portion 6 located closest to the magnetic pole portion 7 and in which the iron wedge 8F is fitted, the radius (curvature) of the circular arc of the slant face rising position 12 is set larger than that in the other teeth portion 6 shown in FIG. 5(a).

Thus, the radius (curvature) of the circular arc of the slant face rising position 12 in the teeth portion 6 with the iron wedge 8F fitted therein is set larger than that in the remaining teeth. Consequently, it is possible to diminish the stress imposed on the slant face rising position 12.

Thus, the stress concentration at the position (slant face rising position) 12 where stress is concentrated to the greatest extent in each teeth 6-wedge 8 fitting portion, can be diminished, so that the slots 5 can be deepened within the strength range of the material which constitutes the teeth 6. As a result, the volume of field windings in the slots 5 can be increased and hence it is possible to enlarge the magnetic field generated.

A concrete description will now be given about the arcuate shape of the slant face rising position 12 of the teeth 6.

Figure 6:
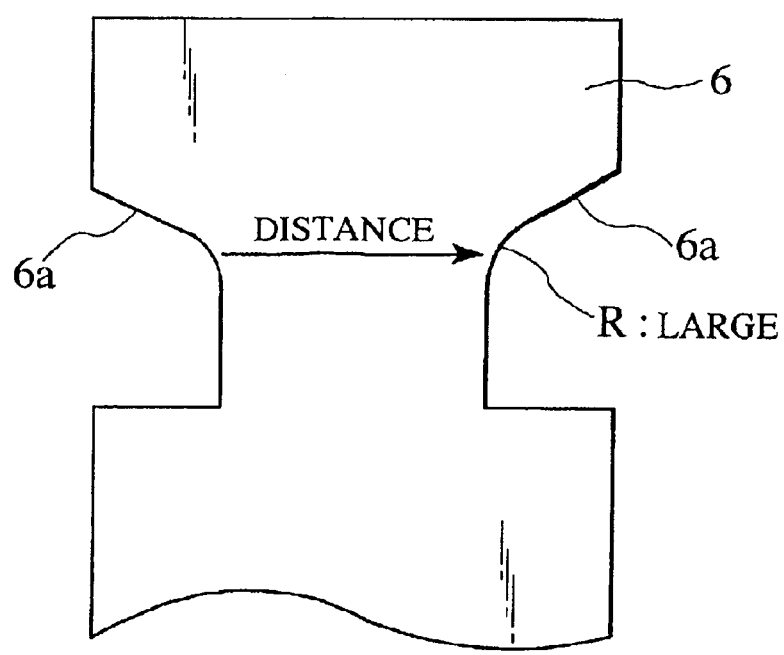
FIG. 6 is a stress distribution diagram of teeth for explaining the present invention.
Figure 7:
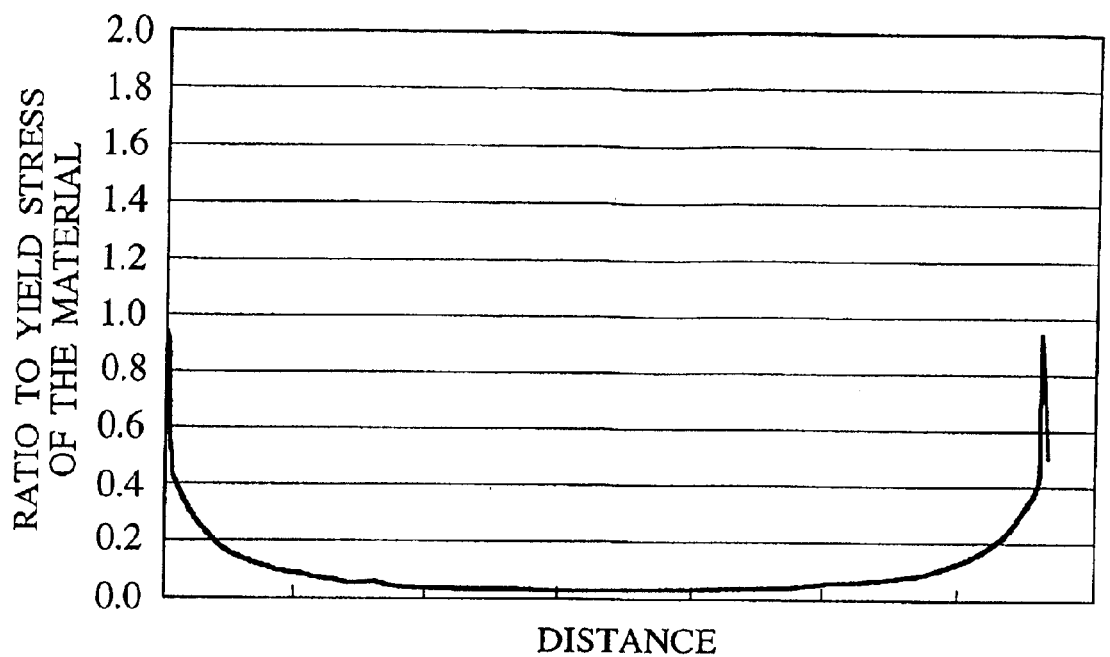
FIG. 7 is a stress distribution diagram of teeth for explaining the present invention.

FIG. 6 is an enlarged view of the teeth 6-wedge 8 fitting portion and FIG. 7 illustrates a stress distribution in each teeth portion 6.

The values of stress shown in FIG. 7 are the results of division by the yield stress of the material used. As shown in the same figure, the closer to both sides in section of the teeth portion 6, the larger the stress. At the curvature (R=4.0) of arc according to the present invention, the maximum stress is about 0.95 of the yield stress. The maximum stress increases as the radius of curvature of the slant face rising position 12 in the teeth portion 6 becomes smaller.

Figure 8:
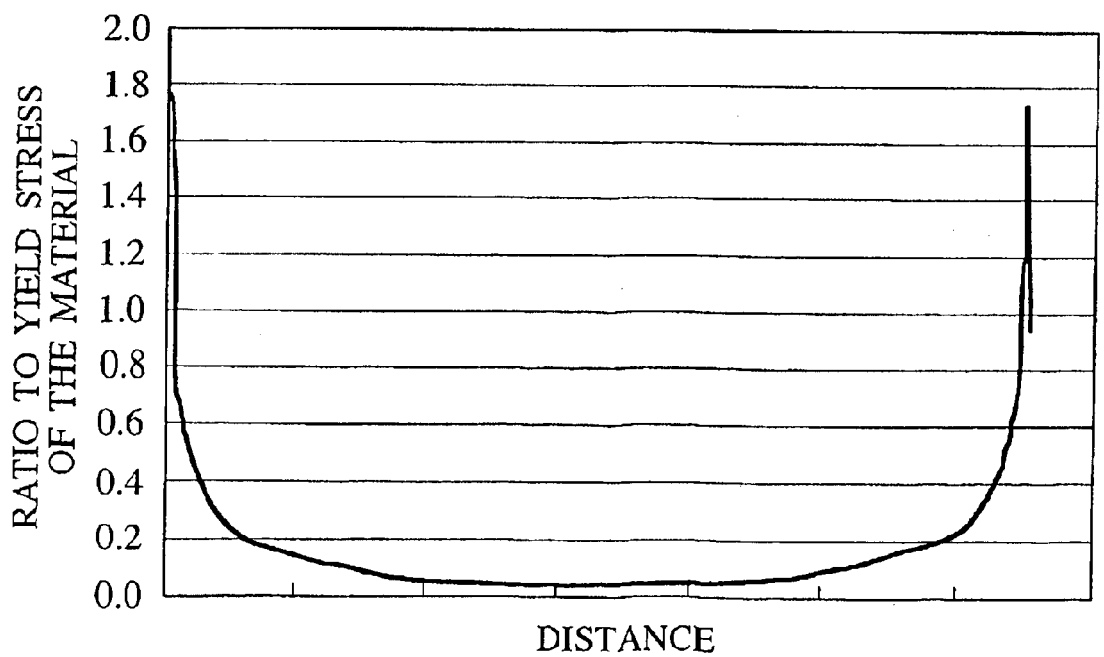
FIG. 8 is a stress distribution diagram of teeth for explaining the present invention.

FIG. 8 shows a stress distribution with a circular arc not formed in the slant face rising position 12 of the teeth portion 6 in question. As is apparent from FIG. 8, the maximum stress is about 1.75 of the yield stress. It is seen that the material undergoes plastic deformation during rotation.

Figure 9:
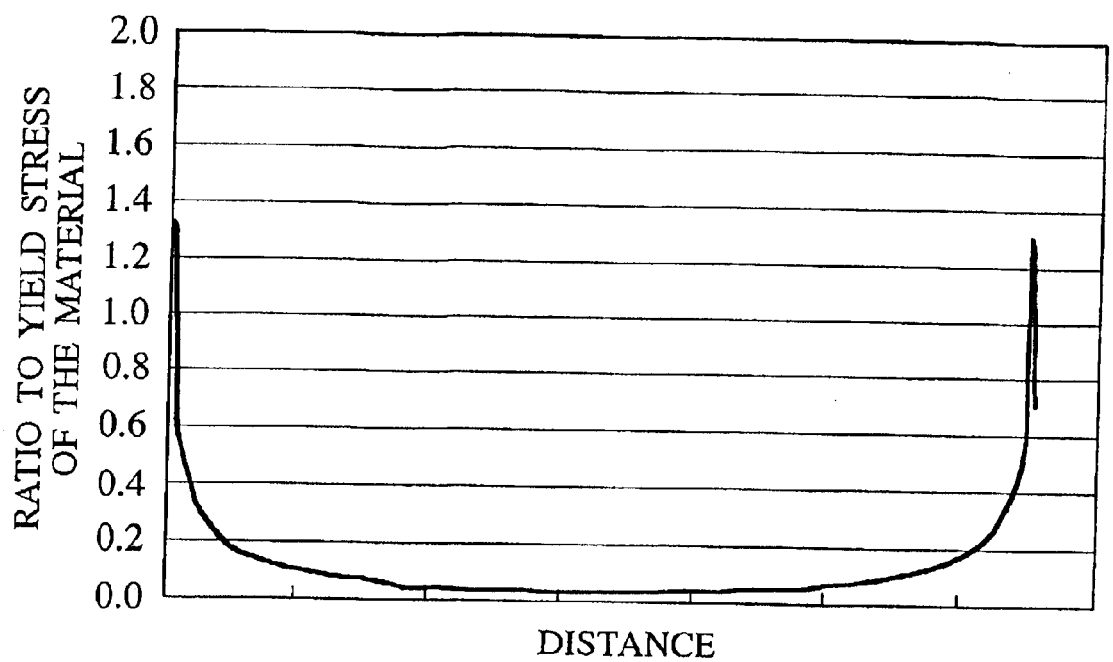
FIG. 9 is a stress distribution diagram of teeth for explaining the present invention.
Figure 10:
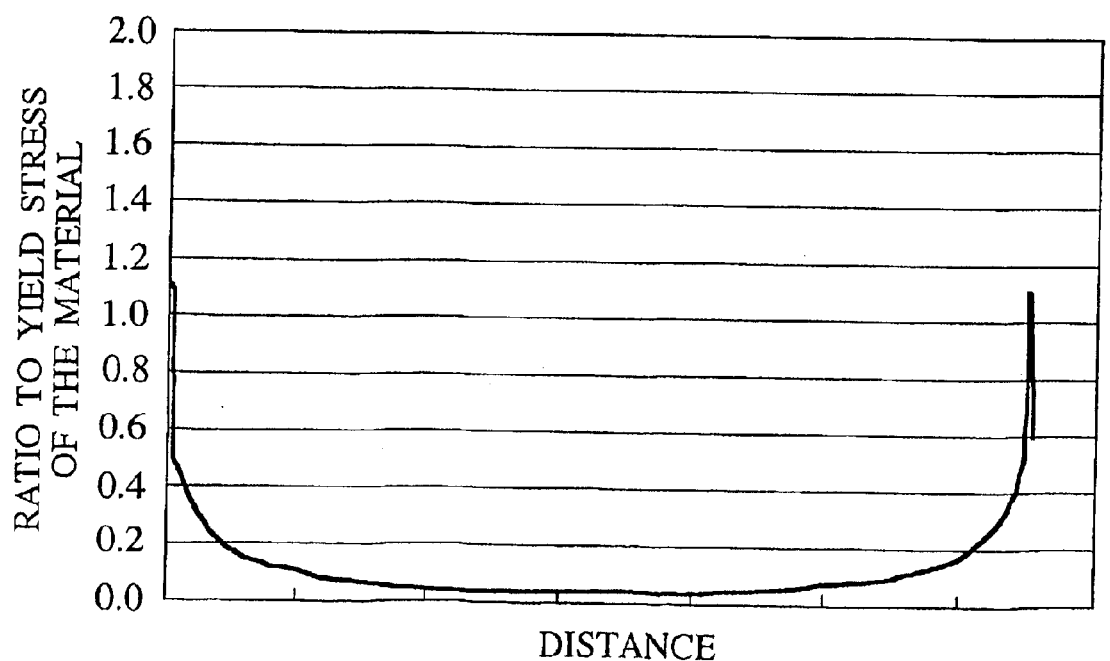
FIG. 10 is a stress distribution diagram of teeth for explaining the present invention.

FIG. 9 shows the result with the radius of curvature set at R=2.0 and FIG. 10 shows the result with the radius of curvature set at R=3.0. As is apparent from both figures, with a decrease in the radius of curvature, the maximum stress increases and exceeds the yield strength of the material use.

In the present invention, the curvature of a circular arc formed at the slant face rising position 12 of the teeth 6 is set at an optimal curvature so as to be kept within the range of yield stress or strain of the material used, whereby a sufficient fatigue life can be ensured while maintaining the centrifugal force of the field windings 4.

In the present invention, as described above, since the radius of a circular arc formed at each slant face rising position in a preset number of teeth located near magnetic pole portions is set larger than that of a circular arc formed at each slant face rising position in the remaining teeth, the stress at the slant face rising position can be dispersed and hence it is possible to prevent damage of the teeth. As a result, it is possible to deepen the slots and enlarge the magnetic field generated in the field windings, thus permitting the reduction in size of the rotor.

Moreover, since the portion to be machined is limited to only the portion where the maximum stress is generated without subjecting all the teeth (slots)-wedge fitting portions to machining for enlarging the radius of curvature thereof, it is possible to decrease the number of machining steps.

Further, in the case where an iron wedge is fitted in a slot located on one side of a teeth portion and an aluminum wedge is fitted in a slot located on the other side, the teeth portion undergoes a flexural deformation due to a difference in centrifugal force between both wedges, but in the present invention a preset number of teeth located near magnetic pole portions are constituted so that each slant face rising position is diminished in stress and becomes easier to deform, whereby it becomes possible to absorb the flexural deformation.

In the present invention, since the radius of a circular arc formed at each slant face rising position in a present number of teeth located near magnetic pole portions is set larger than that of a circular arc formed in each slant face rising position in the remaining teeth, it is possible to diminish stress at the slant face rising position and hence possible to prevent damage of the teeth. As a result, it is possible to deepen slots and enlarge the magnetic field generated in the field windings, thus permitting the reduction in size of the rotor.

What is claimed is:

1. A rotor in a rotary electric machine, comprising:

a plurality of slots which are formed axially of the rotor;

windings which are inserted into said slots;

wedges for holding said windings which are fitted in said slots, said wedges each having slant faces formed at a predetermined angle relative to a radial direction of an iron core of the rotor; and teeth which are formed between adjacent said slots, said teeth having slant faces for abutment against said slant faces of said wedges to retain the wedges each in a fitted state between adjacent said teeth, a rising position of each said slant face in said teeth being formed in an arcuate shape;

wherein, in a predetermined number of said teeth which are located near magnetic pole portions in said rotor core portion, the arcuate shape at each said slant face rising position has a radius of curvature larger than that of the arcuate shape at each said slant face rising position in the remaining teeth.

2. A rotor in a rotary electric machine, comprising:

a plurality of slots which are formed axially of the rotor in the other portion than magnetic pole portions of the rotor;

windings which are inserted into said slots;

wedges for holding said windings which are fitted in said slots, said wedges each having slant faces formed at a predetermined angle relative to a radial direction of an iron core of the rotor; and teeth which are formed between adjacent said slots, said teeth having slant faces for abutment against said slant faces of said wedges to retain the wedges each in a fitted state between adjacent said teeth, a rising position of each said slant face in said teeth being formed in an arcuate shape;

wherein, in those of said teeth which are located near the magnetic pole portions of said iron core of the rotor and in which are fitted iron wedges, the radius of the arcuate shape at each said slant face rising position is set larger than that of the arcuate shape at each said slant face rising position in the remaining teeth.

3. A rotor in a rotary electric machine, comprising:

a plurality of slots which are formed axially of the rotor in the other portion than magnetic pole portions of the rotor;

windings which are inserted into said slots;

wedges for holding said windings which are fitted in said slots, said wedges each having slant faces formed at a predetermined angle relative to a radial direction of an iron core of the rotor; and teeth which are formed between adjacent said slots, said teeth having slant faces for abutment against said slant faces of said wedges to retain the wedges each in a fitted state between adjacent said teeth, a rising position of each said slant face in said teeth being formed in an arcuate shape;

wherein, in those of said teeth which are located near the magnetic pole portions of said iron core of the rotor and in which are fitted iron wedges, the radius of the arcuate shape at each said slant face rising position is set larger than that of the arcuate shape at each said slant face rising position in the remaining teeth in which are fitted aluminum wedges.

* * * * *